3,388,060
PROCESS AND COMPOSITION FOR PURIFICATION OF WATER SUPPLIES AND AQUEOUS WASTES

Joseph Ralph Clark, Lindcroft, N.J., assignor to Parsons, Brinckerhoff, Quade & Douglas, a partnership
No Drawing. Continuation-in-part of application Ser. No. 386,059, July 29, 1964. This application Aug. 28, 1967, Ser. No. 663,505
12 Claims. (Cl. 210—52)

ABSTRACT OF THE DISCLOSURE

This invention relates to a process for the purification of potable water, domestic sanitary sewage, aqueous industrial wastes and aqueous process streams which comprises the steps of adding to the water a primary water-soluble inorganic coagulant, at least one organic polyelectrolyte coagulant aid and acid-treated fly ash, agitating said mixture until a floc is formed, allowing said floc to settle and recovering purified water. The above process results in excellent removal of organics and phosphates from the treated water in the primary treatment step.

Reference to earlier applications

This application is a continuation-in-part of my copending United States patent application Ser. No. 386,059, filed July 29, 1964, now U.S. Patent No. 3,338,828, dated Aug. 29, 1967.

The prior art

Most potable waters and non-potable waters used for industrial purposes are clarified to remove substances which impart turbidity and objectionable color to the water. These substances are mainly non-settling, colloidal silt and clay, phosphates from detergents, and minute forms of organic matter, plant life and micro-organisms usually found in surface waters such as lakes, rivers, streams, etc. The colloidal silt particles are major problems because they are present at all times and are present in high concentrations at certain times due to heavy rains, melting snow, high winds, etc.

Under certain conditions where the concentrations of these objectionable materials do not exceed low limits fairly effective removal may be effected by slow sand filtration alone. However, coagulation is essential where removal of turbidity, phosphates, organic color and bacteria is the main object of the treatment. In certain water treating plants, where additional treatment such as prechlorination, removal of tastes and odors with activated carbon, post-chlorination, etc., are required, coagulation will materially aid these operations.

In water treatment terminology, a coagulant is defined as an agent added to water to facilitate the settling out of colloidal or finely divided suspended matter. Coagulation is the treatment process which refers to a series of chemical and mechanical operations by which the coagulants themselves are applied and made effective. These operations are commonly divided into two distinct phases, i.e., mixing wherein the dissolved coagulant is rapidly dispersed throughout the water to be treated, usually accompanied by agitation, and flocculation, which involves agitation of the water at somewhat lower velocities for a much longer period of time, during which the very small particles grow and agglomerate into well defined hydrated flocs of sufficient size to promote rapid settling. The broad term clarification is generally used to include both coagulation and sedimentation or settling out. For convenience, I define the water-soluble conventional coagulants as primary or "common" coagulants.

The most widely used primary coagulants are aluminum or iron salts of either sulfuric or hydrochloric acid. Aluminum sulfate, $Al_2(SO_4)_3$ (sometimes designated as filter alum), is still the most widely used coagulant. Ferrous sulfate, $FeSO_4 \cdot 7H_2O$ (known as copperas), is also used to a great extent. Ferric sulfate, $Fe_2(SO_4)_3$ (sometimes known as "ferrifloc" or "ferrisul"), ferric chloride, $FeCl_3 \cdot 6H_2O$, and sodium aluminate, $Na_2Al_2O_4$, are also employed as primary coagulants.

The chemical reactions which occur during coagulation are somewhat complex, and involve not only the direct union of the coagulant ions with impurities in the water, but they also involve the formation of hydrous oxides. For example, the reaction of aluminum sulfate may be shown as follows:

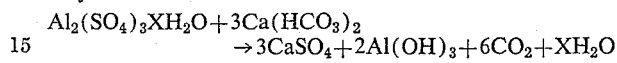

In this equation it will be noted that the aluminum sulfate reacts with the naturally occurring alkalinity of the water (shown as calcium bicarbonate, $Ca(HCO_3)_2$). The hydrous oxide, $Al(OH)_3$, is the floc which ultimately precipitates and removes the objectionable contaminants from the water.

The amount of primary coagulant required to completely free a water of turbidity will vary greatly from as little as 1 or 2 parts per million to more than 100 parts per million. The exact quantity of coagulant can usually be determined only by trial and error. The amount even thus determined will vary with other factors such as time of mixing, water temperature, etc. For example, the minimum quantity of coagulant determined to be effective in producing good flocculation in a given water would generally require a fairly long mixing time varying from 15 to 30 minutes in the summer and from 30 to 60 minutes in the winter when water temperatures approach the freezing point. Very finely divided suspended matter is more difficult to coagulate than the coarser particles, necessitating a larger amount of coagulant for a given turbidity. The character of the water also has considerable influence on the pH value at which satisfactory flocs may be formed. In some waters, it may be quite difficult to obtain good coagulation with alum at a pH of 7.5 whereas in other waters, especially those high in calcium bicarbonate, excellent coagulation may be obtained at a pH of 8.5 or even higher. Generally speaking, it has been found that natural waters need pH adjustment towards either the acid or alkaline side of 7 to obtain efficient and economical coagulation.

Although it is not necessary to discuss at great length the mechanism of flocculation, it should be pointed out that in the promotion of growth of the floc particles, flocculation depends both upon physical action, particularly agitation of the water and adhesion of the turbidity-producers, as well as upon those chemical or electronic forces which exert a material effect upon the physical action. The physical action in the flocculation phase of coagulation is accomplished either by mechanical devices, called flocculators, or by a system of baffles in the mixing basin whereby the high mixing velocities are gradually reduced to a point where floc already formed in the mixing phase will not be broken up but will be maintained in suspension. The coagulation period will vary considerably from plant to plant. Generally speaking, the majority of water plants operate on a 10 to 30 minute coagulation period with the broad range being from 3 to 90 minutes.

Although it is sometimes possible to obtain satisfactory flocculation by the use of a single "common" coagulant as previously defined, many waters require a more complex type of treatment. A number of materials not per se considered coagulants have been found to possess properties which aid the coagulant in the performance of its function. These are denominated coagulant aids.

Broadly speaking, alkalis such as lime and soda ash, or acids such as sulfuric, hydrochloric and phosphoric acid may be considered coagulant aids. Sodium silicate partially neutralized with dilute sulfuric acid and known as "activated silica" is a coagulant aid.

In addition to the commonly used coagulants such as alum, copperas, and the like, certain highly colloidal clays of the swelling bentonite type have been used for clarification. These clays are produced generally in the vicinity of the Black Hills of Wyoming and South Dakota and they are capable of forming thick gels many times the volume of the original bentonite when added to water. They are sometimes denominated as "sodium bentonites," and their use for water purification purposes is fully described in U.S. Patents 2,345,827 and 2,363,022.

The use of a bentonitic clay and an organic polyelectrolyte as a coagulant aid is known to increase the coagulating efficiency of known coagulants.

In my United States Patent No. 3,338,828, there is described a process for improving the floc formation of the mixture of a primary water-soluble inorganic coagulant and at least one organic polyelectrolyte coagulant aid by the addition to the treated water of electrostatically-precipitated fly ash. This results in a considerable improvement in floc formation in many types of water. However, this improvement is not universal and does not effect material removal of phosphates from the water.

Objects of the invention

An object of the present invention is the development of a process for the purification of potable water, domestic sanitary sewage, aqueous industrial wastes and aqueous process streams which comprises the steps of adding to the water a primary water-soluble inorganic coagulant, acid-treated fly ash, and optionally at least one organic polyelectrolyte coagulant, and agitating said mixture until a floc is formed, allowing said floc to settle and recovering purified water.

Another object of the present invention is to provide an improved coagulant aid utilizing acid-treated fly ash.

A further object of the invention is to provide a novel treatment of water and aqueous wastes utilizing acid-treated fly ash, with improved removal of tastes, phosphates, odors and colors.

A still further object of the invention is to provide a novel coagulation treatment process of water and aqueous wastes with more economical amounts of coagulant and coagulant aids through the utilization of acid-treated fly ash.

These and other objects of the present invention will become more apparent as the description thereof proceeds.

Description of the invention

The novel process of the invention for clarifying water and aqueous wastes comprises adding to the water or aqueous wastes a primary water-soluble inorganic coagulant and small amounts of, for example, 1 to 250 p.p.m. or more of an acid-treated fly ash, which forms a floc and separating the clarified water from said floc.

The amount of acid-treated fly ash employed can vary depending on the type of water being treated and on whether coagulant aids are also employed. Ordinarily, depending on the pH and clarity of the water being treated, from 2 to 30 p.p.m. of acid-treated fly ash is usually preferred.

Acid-treated fly ash as referred to herein describes the acid-treated ash residue remaining from the combustion or partial combustion of carbonaceous materials, particularly fossil fuels such as coal and lignite as recovered from flue gas of the combustion by either inertial means such as cyclone separators or, preferably, by Cottrell precipitation or other electrostatic processes or by off-gas filtration and is electrostatically precipitated or electrostatically charged. This ash residue is contacted with an aqueous solution of a strong mineral acid or strong organic acid such as sulfuric acid, hydrochloric acid, nitric acid, sulfamic acid, etc., for from 1 to 60 minutes. The amount of acid utilized can vary from 1% to 100% of the theoretical amount required to act on the metals present in the fly ash and it is practical to utilize about twice the weight of the aqueous acid solution to treat one part of fly ash. The acid-treated fly ash can be recovered from the acid treatment by allowing the fly ash to settle and thereafter drying the acid-treated fly ash at about 105° C. However, and preferably, the fly ash can be prepared and utilized in a stock suspension in the aqueous acid solution.

A particularly preferred embodiment of the invention comprises utilizing an organic polyelectrolyte coagulant aid together with the primary water-soluble inorganic coagulant and the acid-treated fly ash. When these ingredients are added to the water to be clarified, agitated for 5 to 30 minutes and allowed to flocculate under slow agitation, an extremely heavy floc is formed rapidly and settles promptly. The clarified water recovered by this process has a reduction from 90% to almost 100% of the original turbidity, a reduction of from 50% to 90% of the chemical oxygen demand (COD) and the biological oxygen demand (BOD) and almost complete reduction of the phosphate and polyphosphate ions, in one primary treatment step.

The use of an organic polyelectrolyte coagulant aid with the acid-treated fly ash of the invention gives more rapid coagulation and larger floc build up which results in more rapid floc settling velocities. For example, coagulation and floc settling times have been reduced more than 90% with the novel process of the invention as compared to the use of the coagulant alone or the coagulant and coagulant aid alone. This permits a reduction of the treatment plant size or conversely increases the capacity of a standard size treatment plant and therefore reduces the capital investment. Another advantage of the coagulant aids of the invention is that less coagulant and organic polyelectrolyte is required which reduces the cost of the treatment. Fly ash is usually a waste product and is therefore very inexpensive. The acid treatment adds only slightly to its cost.

The order of addition of the acid-treated fly ash, organic polyelectrolyte and the coagulant is not critical and may usually be made in any order. However, best results are usually obtained if all of the said products are added at approximately the same time.

Polyelectrolytes and the present state of the art are defined by Betz Handbook of Industrial Water Conditioning, 6th ed., 1962, as follows: "Polyelectrolytes are high molecular weight water-soluble polymers that contain groups capable of undergoing electrolytic dissociation to give a highly charged, large molecular weight ion." Originally, the term was applied only to synthetic polymers or copolymers but has become more inclusive through general use. The term now includes naturally occurring organic flocculents many of which function through hydration alone rather than through electrolytic activity. In some cases, the term is applied to combination of natural organic flocculents and inorganic weighting agents.

Polyelectrolytes are further classified as anionic, cationic or nonionic. Polymers whose functional groups in water solution give positively charged particles are cationic. Polymers that dissociate to form negatively charged ions are called anionic. Polymers in the nonionic group provide both positive and negative charges in solution.

The mechanisms of the aids are not completely understood but a great deal of research is being done in order to develop further knowledge of this function. Such factors relating to colloidal behavior as zeta potential, Brownian movement, Van der Walls forces and electrophoretic mobility are being studied to determine a more scientific approach to the selection of coagulants and coagulant aids. At the present time the most dependable tool for checking out a system of coagulants is the well known jar test . . . ."

The use of the word "polyelectrolyte" in the description of the present invention refers to the broad definition quoted above from the Betz handbook, with the further extension to include inorganic polymeric coagulant aids such as activated silica.

Examples of suitable polyelectrolytes which are particularly effective are water-soluble cellulose derivatives such as hydroxyethyl cellulose, carboxymethyl cellulose, hydroxyethyl carboxymethyl cellulose, modified starches, starch ethers, polysaccharides such as carragheen, guar gum, pectin, glue, water soluble polyacrylamides, hydrolyzed water soluble polyacrylamides having an average molecular weight of at least 10,000 polyethylene oxides, sulfonated alkylaryl high molecular weight polymers such as sulfonated polystyrene, etc.

The amount of organic polyelectrolyte coagulant aid which is employed in the process of the invention can be reduced materially over that ordinarily recommended. Amounts of between 0.02 to 3.0 p.p.m. are preferably employed.

As indicated, the amount of primary water-soluble inorganic coagulant can likewise be reduced substantially without effecting the heavy and rapid floc formation. Comparable results are usually obtained with 50% of the coagulant normally employed, even in the presence of the polyelectrolyte coagulant aid.

For optimum results, it has been found that the pH of the treated water if acidic should be adjusted to around 7. This is accomplished by the aid of lime with normally acidic waters. In the case of alkaline waters adjustment of the pH may not be necessary as the floc formation by the process of the invention readily occurs in waters having a pH of up to 11. However, some control of the pH in highly alkaline waters can be had by the use of acidic stock solutions of the acid-treated fly ash.

The process is equally effective in treating potable water supplies such as rivers and creeks, sewage from industrial wastes and domestic wastes and all other types of water which require clarification before utilization. Pre-chlorination or aeration of the water before treatment does not effect the results in any manner.

The following examples are illustrative of the process of the invention. It is to be understood however that they are not to be deemed limitative in any manner.

EXAMPLE I

Simultaneous tests were made using one liter water samples in laboratory test jars with a multiple speed stirrer. After addition of the coagulant, the acid-treated fly ash and the organic polyelectrolyte coagulant aid, the size of the floc formed and the time of formation of the floc were determined. Comparison tests were also made. The floc size was rated according to the following scale:

|  | Mm. |
|---|---|
| Very small (V.S.) | <1 |
| Small (S.) | 1 |
| Medium small (M.S.) | 1.5 |
| Medium (M.) | 2 |
| Medium large (M.L.) | 2.5 |
| Large (L.) | 3 |
| Very large (V.L.) | >3 |

The tests were conducted on raw water from the Millestone River, near Princeton, N.J., having an initial turbidity of 8.6 and a pH of 8.0. The coagulant was FeCl$_3$ employed at a rate of 130 lbs. per million gallons (lbs./mg.) (as hydrate) in all tests. The results are given in Table I.

TABLE I

| Jar | Chemical Addition, lbs./mg. | | | Temp., °C. | Floc | Turbidity of the clarified water |
|---|---|---|---|---|---|---|
|  | FeCl$_3$ | C.A. | Fly Ash |  |  |  |
| 1 | 130 | | | 17.5 | V.S. | 8.9 |
| 2 | 130 | 1.6 | | 17.5 | S | 6.1 |
| 3 | 130 | 1.6 | 100 A | 17.5 | M | 6.4 |
| 4 | 130 | 0.8 | 100 A | 17.5 | M | 7.1 |
| 5 | 130 | 1.6 | 100 B | 17.5 | V.L. | 2.95 |

The coagulant aid (C.A.) was Magnifloc 990, a polyacrylamide. Fly Ash A was an electrostatically precipitated fly ash, Fly Ash B was acid-treated Fly Ash A, treated with 3% of the theoretical of HCl and dried at 105° C. The turbidity was measured by Jackson units after two minutes of clarification. The various tests were mixed for 30 seconds at 100+ r.p.m., 30 seconds at 55 r.p.m., 35 seconds at 32 r.p.m., 40 seconds at 30 r.p.m., 70 seconds at 20 r.p.m. and 40 seconds at 15 r.p.m. for a total of about 4 minutes of mixing.

These results show the clear superiority of the acid-treated fly ash in floc formation and the reduction of turbidity.

EXAMPLE II

Under the same conditions as Example I, a different raw water having a pH of 7.35 and a turbidity of 7.8 was treated by mixing the chemicals for a period of 20 minutes. The results are given in Table II.

TABLE II

| Jar | Chemical Addition, lbs./mg. | | | Temp., °C. | Floc | Final Turbidity |
|---|---|---|---|---|---|---|
|  | FeCl$_3$ | C.A. | Fly Ash |  |  |  |
| 1 | 130 | | | 24.0 | S | 2.25 |
| 2 | 130 | 1.6 | 100 B | 24.0 | V.L. | 1.05 |
| 3 | 130 | | 100 B | 24.0 | L | 1.17 |

The coagulant aid was Magnifloc 990 and Fly Ash B was an electrostatically-precipitated fly ash, treated with 3% of the theoretical of HCl and dried at 105° C. Jar 2 settled almost immediately after stirring was stopped, Jar 3 settled in about 1 minute and Jar 1 took over 5 minutes to clarify.

EXAMPLE III

Electrostatically-precipitated fly ash was treated with the acids shown in Table III by stirring the acid, employed in a concentration of about 35%, and the fly ash in a 2:1 weight ratio for 30 minutes and then placing the mixture in a water bath and evaporating to dryness. Jars of various waters and aqueous wastes were then mixed with the chemicals of Table III for 20 minutes at 45 r.p.m. and allowed to settle. The coagulant aid (C.A.) was Drew floc No. 21. This material is a cationic modified starch. The values for lime and alum are in pounds per million gallons of water and the fly ash, coagulant aid and sodium aluminate (AlO$_3^+$) are in parts per million.

TABLE III

| Type of Water | Original | | Chemicals | | | | | Size of floc | Final | |
|---|---|---|---|---|---|---|---|---|---|---|
|  | Turbidity | pH | Alum, p.m.g. | Lime, p.m.g. | Acid-Treated Fly Ash, p.p.m. | AlO$_3^+$, p.p.m. | C.A., p.p.m. |  | Turbidity | pH |
| Vinyl plastic wash water | 208 | 6.4 | 130 | 55 | 40 (HCL) | 8 | 2 | L | 3.2 | 7.1 |
|  |  |  | 150 | 65 | 40 (HCL) | 8 | 2 | L | 0.8 | 7.1 |
|  |  |  | 120 | 50 | 40 (H$_2$SO$_4$) | 8 | 2 | M.L. | 1.0 | 7.1 |
|  |  |  | 140 | 60 | 40 (H$_2$SO$_4$) | 8 | 2 | M.L. | 0.5 | 7.2 |
|  |  |  | 130 | 90 | 70 (sulfamic acid) | 8 | 2 | L | 1.3 | 7.3 |
|  |  |  | 140 | 100 | 80 (sulfamic acid) | 8 | 2 | L | 0.8 | 7.3 |
|  |  |  | 140 | 60 | 40 (HCL) | 8 | 2 | L | 0.9 | 7.2 |
| Steel terminal waste effluent | 41 | 6.3 | 160 | 65 | 40 (HCL) | 8 | 2 | L | 0.6 | 7.3 |
|  |  |  | 120 | 55 | 40 (H$_2$SO$_4$) | 8 | 2 | L | 0.7 | 7.3 |
|  |  |  | 140 | 60 | 40 (H$_2$SO$_4$) | 8 | 2 | L | 0.3 | 7.2 |

EXAMPLE IV

The following test demonstrates how the acid-treated fly ash of the invention also reduces the amount of BOD and COD in raw sewage which was aerated for 30 minutes before treatment and without any post chlorine treatment which will further reduce the BOD and COD values. The sewage had an original turbidity of 165, a COD of 830 and a BOD of 260 and a zeta potential of −37 mv. The said sewage was admixed with 2 p.p.m. of C.A. (Drew floc No. 21), 8 p.p.m. of $AlO_3^+$, 40 p.p.m. of acid-treated fly ash and varying amounts of alum and lime in a mixer of 45 r.p.m. for 20 minutes. The sewage was then allowed to settle for 30 minutes and the results are given in Table IV

TABLE IV

| Acid used to treat fly ash | Alum, p.m.g. | Lime, p.m.g. | Size of floc | Final Turbidity | pH | BOD | COD |
|---|---|---|---|---|---|---|---|
| HCl | 150 | 800 | L | 43 | 11.0 | 60 | 197 |
|  | 260 | 350 | L | 44 | 9 | 90 | 415 |
|  | 280 | 65 | L | 73 | 7 | 100 | 186 |
| $H_2SO_4$ | 150 | 800 | L | 19 | 11.0 | 75 | 121 |
|  | 260 | 300 | L | 24 | 9 | 80 | 163 |
|  | 280 | 215 | L | 71 | 7 | 181 | 297 |

EXAMPLE V

This example illustrates how the acid-treated fly ash can effectively remove substantially all the phosphate values from aqueous solutions and demonstrates the superior settling ability of acid-treated fly ash as compared to same fly ash untreated. Raw sewage treated to give a pH 11.2 and had a turbidity of 187, COD of 615 and total phosphate of 8.3 p.p.m. was stirred with the chemicals of Table V for 20 minutes at 415 r.p.m. and then allowed to settle for 30 minutes. The fly ash used was mixed with hydrochloric acid in a 2:1 weight ratio for 5 minutes and the resulting slurry was diluted with water to form a stock solution containing 12 gm. of fly ash per liter of solution, the C.A. was Drew floc No. 21.

EXAMPLE VI

This example demonstrates that the acid-treated fly ash of the invention will remove phosphates from water over a wide pH range of the water while the same fly ash without acid treatment will only effectively remove phosphates at a high pH. The water used in this test was Delaware River water having a pH of 6.8 and containing 0.35 p.p.m. of ortho phosphates and 5.01 p.p.m. of meta phosphates. The water and chemicals of Table VI were stirred for 20 minutes at 45 r.p.m. and then the water was allowed to settle for 30 minutes.

TABLE VI

| Chemicals | | | | | | pH | Ortho Phosphate, p.p.m. | Meta Phosphate, p.p.m. |
|---|---|---|---|---|---|---|---|---|
| Alum | Lime | $Na^2AlO^3$ | C.A. | Acid fly ash | Untreated fly ash | | | |
| 250 | 1,000 | 8 | 3 | 50 | | 11.2 | 0.02 | 0.03 |
| 250 | 1,000 | 8 | 3 | 100 | | 11.2 | 0.01 | 0.02 |
| 250 | 900 | 8 | 3 | 150 | | 10.0 | 0.000 | 0.004 |
| 250 | 900 | 8 | 3 | 200 | | 9.0 | 0.000 | 0.001 |
| 250 | 800 | 8 | 3 | 250 | | 8.5 | 0.000 | 0.001 |
| 250 | 750 | 8 | 3 | 300 | | 8.0 | 0.000 | 0.001 |
| 250 | 1,000 | 8 | 3 | | 50 | 11.2 | 0.05 | 0.24 |
| 250 | 1,000 | 8 | 3 | | 100 | 11.2 | 0.025 | 0.24 |
| 250 | 900 | 8 | 3 | | 150 | 10.0 | 0.3 | 0.42 |
| 250 | 900 | 8 | 3 | | 200 | 9.0 | 0.35 | 2.5 |
| 250 | 800 | 8 | 3 | | 250 | 8.5 | 0.35 | 3.6 |
| 250 | 750 | 8 | 3 | | 300 | 8.0 | 0.35 | 4.2 |

The alum, lime and sodium aluminate are expressed in pounds per million gallons. The coagulent aid (C.A.) was "A–21," a high-molecular-weight alkyl-aryl sulfonic acid and was added at the rate of 3 p.p.m. The fly ash and acid-treated fly ash are expressed in parts per million.

Table VI shows that acid-treated fly ash effectively removed all phosphate values over a wide alkaline range while untreated fly ash removed phosphate values only at high pH of above 11 and is not as effective. The removal of phosphates from water sources is important since high phosphate values increase the growth of algae in natural waters such as the Great Lakes.

As indicated above, acid-treated fly ash, preferably electrostatically-precipitated fly ash can be employed in the purification and clarification of waters from diverse sources. This compound is utilized with a primary water-soluble inorganic coagulant and optionally with an organic polyelectrolyte coagulant aid. The various chemicals can be added to the water to be treated in any order and in the amounts indicated.

Various compositions of primary water-soluble inorganic coagulants and acid-treated fly ash with optionally an organic polyelectrolyte coagulant aid can also be prepared for use, particularly by the smaller water treating plants. Such compositions can, for example, consist of from about 15% to about 75% by weight of a primary water-soluble inorganic coagulant, about 10% to about 50% by weight of acid-treated fly ash, from 0% to about

TABLE V

| Chemicals | | | | | | Turbidity | $PO_4$ | COD | Color |
|---|---|---|---|---|---|---|---|---|---|
| $FeCl_3$ p.m.g. | Lime, p.m.g. | Fly Ash Acid, p.p.g. | Fly Ash No acid, p.p.g. | $AlO_3^+$, p.m.g. | C.A., p.p.g. | | | | |
| 20 | 2,190 | 40 | | 8 | 3 | 3.0 | 0.2 | 205 | 20 |
| 40 | 2,320 | 40 | | 8 | 3 | 1.5 | 0.1 | 200 | 20 |
| 20 | 2,190 | 100 | | 8 | 3 | 2.0 | 0.1 | 180 | 10 |
| 40 | 2,400 | 100 | | 8 | 3 | 1.0 | 0.1 | 120 | 10 |
| 60 | 2,550 | 100 | | 8 | 3 | 0.8 | 0.1 | 95 | 10 |
| 20 | 2,600 | | 40 | 8 | 3 | 7.0 | 0.5 | 241 | 30 |
| 40 | 2,600 | | 40 | 8 | 3 | 6.0 | 0.5 | 250 | 30 |
| 20 | 2,600 | | 100 | 8 | 3 | 6.0 | 0.4 | 235 | 20 |
| 40 | 2,600 | | 100 | 8 | 3 | 5.0 | 0.4 | 230 | 20 |
| 60 | 2,680 | | 100 | 8 | 3 | 4.0 | 0.35 | 225 | 20 |

5% by weight of an organic polyelectrolyte coagulant aid, and from 0% to about 70% by weight of lime.

The use of acid-treated fly ash has been shown above to be of great value for teritary treatment of sewage and industrial wastes particularly for removal of phosphates and polyphosphates, and refractory organic and inorganic materials which pass through the usual waste treatment plant largely unremoved.

The very high BOD and COD removals which have been effected by the use of acid-treated fly ash are much higher than those which have been attained on similar sewages and industrial wastes using the newest organic polyelectrolyte and other coagulant systems including some of the coagulant aids used in the above examples. It is apparent therefore that the use of acid-treated fly ash as an absorbent is much more effective than that of other materials currently being used. As shown in the examples, it is also much more effective than the use of untreated fly ash.

Various modifications of the compositions and method of the invention may be made such as using very strong inorganic or organic acid in place of the specific acids of the examples without departing from the spirit or scope of the invention and it is to be understood that the invention is to be limited only as defined in the appended claims.

I claim:

1. In the process of clarifying potable water supplies, aqueous wastes and aqueous process streams by contacting said water with a primary water-soluble inorganic coagulant in order to form a floc and separating said water from said floc, the improvement which comprises using with the said coagulant from 1 to 250 parts per million, based on the amount of water, of fly ash treated with 3 to 100% of the theoretical amount of a strong acid.

2. The process of claim 1 wherein the fly ash is electrostatically-precipitated fly ash.

3. The process of claim 1 wherein the amount of acid-treated fly ash is 3 to 100 p.p.m.

4. The process of claim 1 wherein an organic polyelectrolyte coagulant aid is also used.

5. The process of claim 1 wherein the fly ash is treated with a strong mineral.

6. A process for the purification of potable water, domestic sanitary sewage, aqueous industrial wastes and aqueous process streams which comprises the steps of adding to the water a primary water-soluble inorganic coagulant, at least one organic polyelectrolyte coagulant aid and acid-treated fly ash, agitating said mixture until a floc is formed, allowing said floc to settle and recovering purified water.

7. The process of claim 6 wherein said water is aerated for up to 30 minutes prior to said step of addiing coagulants.

8. A process for clarifying water containing dissolved, suspended and colloidal materials and simultaneously removing phosphate values therefrom which comprises contacting said water with an effective amount of a water-soluble inorganic coagulant, at least 0.01 part per million of an organic polyelectrolyte capable of increasing the flocculation rate and the capacity of the water-soluble coagulant to absorb and adsorb said dissolved, suspended and colloidal materials and about 1 to 250 parts per million of acid-treated fly ash, for a length of time sufficient to form a floc and separating from said floc a purified water having less than 0.01 part per million of phosphates values.

9. In the process for removing phosphate values from water containing the same which comprises contacting said water with a source of alkaline earth ions and separating the precipitant, the improvement which comprises contacting said water having a source of alkaline earth ions with from 1 to 250 parts per million of acid-treated fly ash.

10. A process for removing phosphate values from water containing the same which comprises contacting said water with from 1 to 250 parts per million of acid-treated fly ash, separating the precipitant, and recovering water having substantially reduced phosphate values.

11. A process for the purificaiton of potable water, domestic sanitary sewage, aqueous industrial wastes and aqueous process streams which comprises the steps of adding to the water at least one organic polyelectrolyte and acid-treated fly ash, agitating said mixture until a floc is formed, allowing said floc to settle and recovering purified water.

12. A composition for use in treating and clarifying water consisting essentially of from about 0% to about 75% by weight of a primary water-soluble inorganic coagulant, from about 10% to about 95% by weight of acid-treated fly ash, from 0% to about 10% by weight of an organic polyelectrolyte coagulant aid and from 0% to about 70% by weight of lime.

No references cited.

MICHAEL E. ROGERS, *Primary Examiner.*